United States Patent
Menouar et al.

(10) Patent No.: US 8,330,649 B2
(45) Date of Patent: Dec. 11, 2012

(54) METHOD AND APPARATUS FOR DETERMINING WHETHER A MOVING ENTITY IS MOVING IN A PREDETERMINED DIRECTION

(75) Inventors: Hamid Menouar, Vallauris Golf Juan (FR); Massimiliano Lenardi, Antibes (FR)

(73) Assignee: Hitachi, Ltd., Tokyo (JP)

( * ) Notice: Subject to any disclaimer, the term of this patent is extended or adjusted under 35 U.S.C. 154(b) by 1029 days.

(21) Appl. No.: 12/292,172

(22) Filed: Nov. 13, 2008

(65) Prior Publication Data

US 2009/0219194 A1 Sep. 3, 2009

(30) Foreign Application Priority Data

Feb. 28, 2008 (EP) ..................................... 08003648

(51) Int. Cl.
*G01S 13/00* (2006.01)
(52) U.S. Cl. ........................ 342/146; 342/147
(58) Field of Classification Search .................. 342/146
See application file for complete search history.

(56) References Cited

U.S. PATENT DOCUMENTS

| | | | | |
|---|---|---|---|---|
| 3,564,543 A * | 2/1971 | Lovell et al. | ..................... | 342/33 |
| 3,999,007 A * | 12/1976 | Crane | ........................... | 348/123 |
| 5,365,516 A * | 11/1994 | Jandrell | ........................ | 370/335 |
| 5,510,795 A | 4/1996 | Koelle | | |
| 6,037,977 A * | 3/2000 | Peterson | ........................ | 348/148 |
| 6,072,421 A * | 6/2000 | Fukae et al. | ..................... | 342/42 |
| 6,262,764 B1 * | 7/2001 | Perterson | ....................... | 348/148 |
| 7,180,444 B2 * | 2/2007 | Chintyan | .................. | 342/357.31 |
| 7,397,366 B2 * | 7/2008 | Kampel | .................... | 340/539.13 |
| 7,889,691 B2 * | 2/2011 | Chen et al. | ..................... | 370/315 |
| 2007/0040700 A1 * | 2/2007 | Bachelder | ..................... | 340/902 |

* cited by examiner

*Primary Examiner* — John B Sotomayor
*Assistant Examiner* — Matthew M Barker
(74) *Attorney, Agent, or Firm* — Antonelli, Terry, Stout & Kraus, LLP.

(57) ABSTRACT

The present invention relates to a method and an apparatus for determining whether a moving entity is moving in a predetermined direction. A moving entity being equipped with positioning means receives data from a sender comprising information about a position of a point of interest and a position of a reference point. Based on the received data, a first position of the moving entity at a first point in time, and a second position of the moving entity at a second point in time, it is determined whether the moving entity is moving in the predetermined direction. Preferably, angular information is utilized to verify whether the moving entity is moving in the predetermined direction.

21 Claims, 8 Drawing Sheets

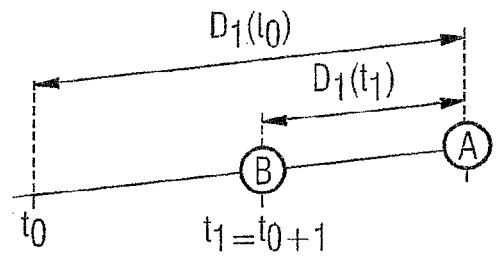
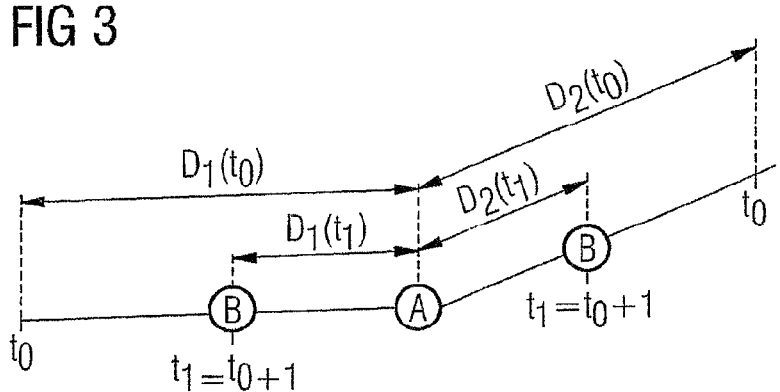
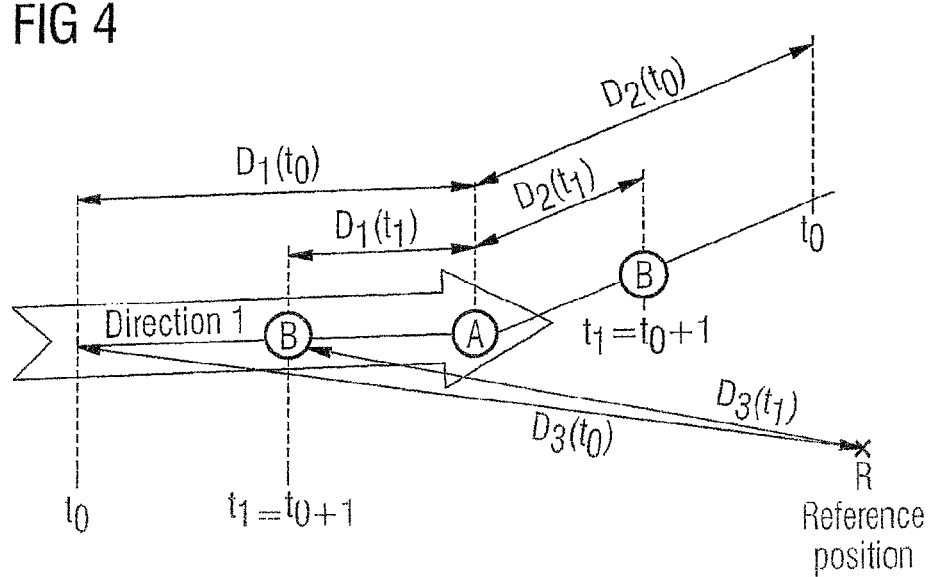

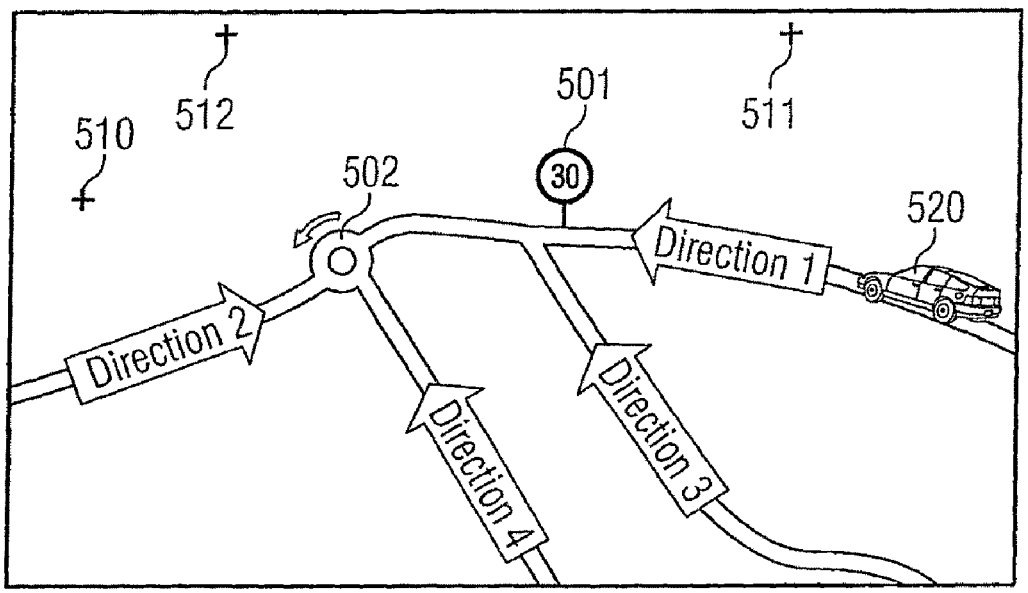

| 1201 | 1202 | 1203 | 1204 |
|---|---|---|---|
| Pos_1 | Ref. Pos_1 | $\alpha_{max\_1}$ | Information_1 |
| Pos_2 | Ref. Pos_2 | $\alpha_{max\_2}$ | Information_2 |
| ... | ... | ... | ... |
| Pos_N | Ref. Pos_N | $\alpha_{max\_N}$ | Information_N |

METHOD AND APPARATUS FOR DETERMINING WHETHER A MOVING ENTITY IS MOVING IN A PREDETERMINED DIRECTION

BACKGROUND

The present invention relates to a method and apparatus for determining whether a moving entity is moving in a predetermined direction.

From U.S. Pat. No. 5,510,795 a circuit for analyzing backscatter-modulated RF signals received from a remote transponder is known. The circuit is able to determine whether the transponder is stationary or moving towards the reader or away from it and in the case that the transponder is moving, it is able to determine the rate at which the transponder is coming or going. In response to the signal received from the transponder, the circuit generates three signals, each having a different phase. By analyzing the pattern and frequency of signal state changes in the three signals, the circuit can determine the transponder's speed and direction of movement.

The Article "Relative Direction Determination in Mobile Computing Networks" by A. Kalis and T. Antonakopoulos, published in the proceedings of the IEEE Instrumentation and Measurement Technology Conference, held in Budapest, Hungary, in May 2001, describes a relative direction determination method for stations of mobile computing networks. The method uses a switched beam array for determining the direction of arrival of an incident electromagnetic field. Certain MAC layer functions are associated with different radiation patterns of the switched antenna array in order to determine the orientation of directional beams on both sides of a communication link.

SUMMARY

It is an object of the present invention to provide a method and apparatus that are able to determine whether a moving entity is moving in a predetermined direction.

This object is accomplished by the subject-matter of the independent claims. Preferred embodiments are specified by the dependent claims.

The invention comprises a method for determining whether or not a moving entity is moving in a predetermined direction. The method may comprise the steps of providing a moving entity having positioning means and receiving means, providing a sender sending data dependent on a position of a point of interest and a position of a reference point, receiving said data sent by said sender on the moving entity, and determining on the moving entity whether or not the moving entity is moving in the predetermined direction based on the received data, a first position of the moving entity at a first point in time, and a second position of the moving entity at a second point in time.

These steps allow to determine whether or not a moving entity is moving in a predetermined direction by using four positions, two positions of the moving entity at different points in time, the position of a point of interest, and the position of a reference point. Preferably, the moving entity is a vehicle.

In the sense of this invention, determining whether a moving entity is moving in a predetermined direction may especially mean that it is determined whether or not a vehicle will be traveling on a predetermined section of a route. In particular, it may be determined whether or not the vehicle will travel along a certain lane of a road section for which a certain condition is given such as a speed limit, traffic light or the presence of a round-about or the like.

Preferably, the method comprises the steps of providing a first position of the moving entity at a first point in time by the positioning means, calculating a first distance between the moving entity and the point of interest based on the received data and the first position, calculating a second distance between the moving entity and the reference point based on the received data and the first position, providing a second position of the moving entity at a second point in time by the positioning means, calculating a third distance between the moving entity and the point of interest based on the received data and the second position, calculating a fourth distance between the moving entity and the reference point based on the received data and the second position, and determining on the moving entity whether or not the moving entity is moving in the predetermined direction based on the first, second, third, and fourth distance.

These steps allow to calculate four distances, two between the moving entity and the point of interest and two between the moving entity and the reference point. Based on these four distances, it can be determined whether or not the moving entity is moving in the predetermined direction.

Preferably, it is determined that the moving entity is moving in the predetermined direction if the first distance is larger than the third distance and the second distance is larger than the fourth distance.

In a preferred embodiment, the method further comprises the steps of calculating verification data and verifying whether or not the moving entity is moving in the predetermined direction based on the verification data.

Preferably, a reference distance between the position of the point of interest and the position of the reference point is determined, and the verification data is calculated depending on an angle between the reference distance and a distance between the moving entity and the reference point. It is also possible to calculate the verification data depending on an angle between the first distance and the second distance or depending on an angle between the third distance and the fourth distance.

Based on the verification data, it can be verified whether or not the moving entity is really moving in the predetermined direction.

In an especially advantageous embodiment of the present invention, the verification data is calculated based on a comparison of $$\frac{(\text{reference distance})^2 - (\text{third distance})^2 + (\text{fourth distance})^2}{2 * \text{reference distance} * \text{fourth distance}}$$

with a predetermined value or a comparison of $$\frac{(\text{third distance})^2 - (\text{reference distance})^2 + (\text{fourth distance})^2}{2 * \text{third distance} * \text{fourth distance}}$$

with a predetermined value.

This allows to easily calculate the verification data. The first formula is based on an angle between the reference distance and the fourth distance, whereas the second formula is based on an angle between the third distance and the fourth distance. The designer of the system may choose which formula to use or may conceive an equivalent formula that is optimized for a certain usage scenario. In the following, whenever the first formula is used, the designer may choose to use the second formula instead.

In a preferred embodiment, the method comprises the step of determining that the moving entity is moving in the predetermined direction if the first distance is larger than the third distance, the second distance is larger than the fourth distance, and $$\left[\frac{(\text{reference distance})^2 - (\text{third distance})^2 + (\text{fourth distance})^2}{2*\text{reference distance}*\text{fourth distance}} > \text{predetermined value}\right.$$
$$\left.\text{or} \frac{(\text{third distance})^2 - (\text{reference distance})^2 + (\text{fourth distance})^2}{2*\text{third distance}*\text{fourth distance}} > \text{predetermined value}\right].$$

If these three conditions are fulfilled, it can be concluded that the moving entity is moving in the predetermined direction.

In a preferred embodiment, the method further comprises the step of updating the data that is sent by the sender.

In this way, the data that is sent by the sender may be modified.

The invention further comprises an apparatus for determining whether or not a moving entity is moving in a predetermined direction. The apparatus may comprise positioning means for positioning the moving entity, receiving means for receiving data sent by a sender sending data dependent on a position of a point of interest and a position of a reference point, and determination means for determining whether or not the moving entity is moving in the predetermined direction based on the data received by the receiving means, a first position of the moving entity provided by the positioning means at a first point in time, and a second position of the moving entity provided by the positioning means at a second point in time.

The apparatus according to the invention may have the same advantages as the method according to the invention.

In a preferred embodiment, the apparatus comprises means for providing a first position of the moving entity at a first point in time, means for calculating a first distance between the moving entity and the point of interest based on the data received by the receiving means and the first position, means for calculating a second distance between the moving entity and the reference point based on the data received by the receiving means and the first position, means for providing a second position of the moving entity at a second point in time, means for calculating a third distance between the moving entity and the point of interest based on the data received by the receiving means and the second position, means for calculating a fourth distance between the moving entity and the reference point based on the data received by the receiving means and the second position, and means for determining whether or not the moving entity is moving in the predetermined direction based on the first, second, third, and fourth distance.

Preferably, the apparatus comprises means for determining that the moving entity is moving in the predetermined direction if the first distance is larger than the third distance and the second distance is larger than the fourth distance.

In an advantageous embodiment, the apparatus comprises means for calculating verification data and means for verifying whether or not the moving entity is moving in the predetermined direction based on the verification data.

Preferably, the apparatus comprises means for determining a reference distance between the position of the point of interest and the position of the reference point and means for calculating verification data depending on an angle between the reference distance and a distance between the moving entity and the reference point.

The apparatus may also comprise means for calculating verification data depending on an angle between the first distance and the second distance or means for calculating verification data depending on an angle between the third distance and the fourth distance.

In an advantageous embodiment, the apparatus comprises means for calculating verification data based on a comparison of $$\frac{(\text{reference distance})^2 - (\text{third distance})^2 + (\text{fourth distance})^2}{2*\text{reference distance}*\text{fourth distance}}$$

with a predetermined value. Of course, alternatively the formula based on an angle between the third and the fourth distance may be used or an equivalent formula as explained above.

Preferably, the apparatus comprises means for determining that the moving entity is moving in the predetermined direction if the first distance is larger than the third distance, the second distance is larger than the fourth distance, and $$\frac{(\text{reference distance})^2 - (\text{third distance})^2 + (\text{fourth distance})^2}{2*\text{reference distance}*\text{fourth distance}} > \text{predetermined value}.$$

Of course, alternatively the formula based on an angle between the third and the fourth distance may be used or an equivalent formula as explained above.

Furthermore, the invention comprises a sender for sending data dependent on a position of a point of interest and a position of a reference point, wherein the data is to be received by an apparatus for determining whether or not a moving entity is moving in a predetermined direction according to the invention. The sender preferably comprises means for updating the data that is sent by the sender.

As described above, the method according to the invention uses data to determine whether or not a moving entity is moving in a predetermined direction. The same kind of data is used by the apparatus for determining whether or not a moving entity is moving in a predetermined direction. The apparatus receives the data from a sender according to the invention. Said data preferably comprises a predetermined value. The data may comprise a plurality of positions relating to a plurality of points of interest and it may further comprise a plurality of positions of reference points, wherein preferably each reference point relates to at least one point of interest. The data may comprise a plurality of predetermined values, wherein preferably each predetermined value relates to a predetermined direction.

The apparatus according to the invention may be formed using a positioning means, a receiving means, and a generic hardware on which a software is executed which is adapted to perform the determination whether or not a moving entity is moving in a predetermined direction. Therefore, the invention further comprises a computer program product, comprising a computer readable medium and a computer program recorded therein in form of a series of state elements corresponding to instructions which are adapted to be processed by a data processing means of a data processing apparatus being connectable to a positioning means for positioning a moving entity and a receiving means for receiving data dependent on a position of a point of interest and a position of a reference point, wherein, when the computer program is executed by the data processing means, an apparatus according to the invention is formed.

Preferred embodiments and further details of the present invention will be described in the following with reference to the figures.

BRIEF DESCRIPTION OF THE DRAWINGS

FIG. 2 illustrates a simple approach for determining if a moving entity is approaching a certain position.

FIG. 3 illustrates one drawback of the simple approach of FIG. 2.

FIG. 4 illustrates the basic idea of using a reference position for determining whether or not a moving entity is moving in a predetermined direction according to the present invention.

FIG. 5 shows a scenario in which the invention may be used.

FIG. 6 shows one example of a data structure that may be used by the invention.

DETAILED DESCRIPTION OF THE EMBODIMENTS

Figure 1:
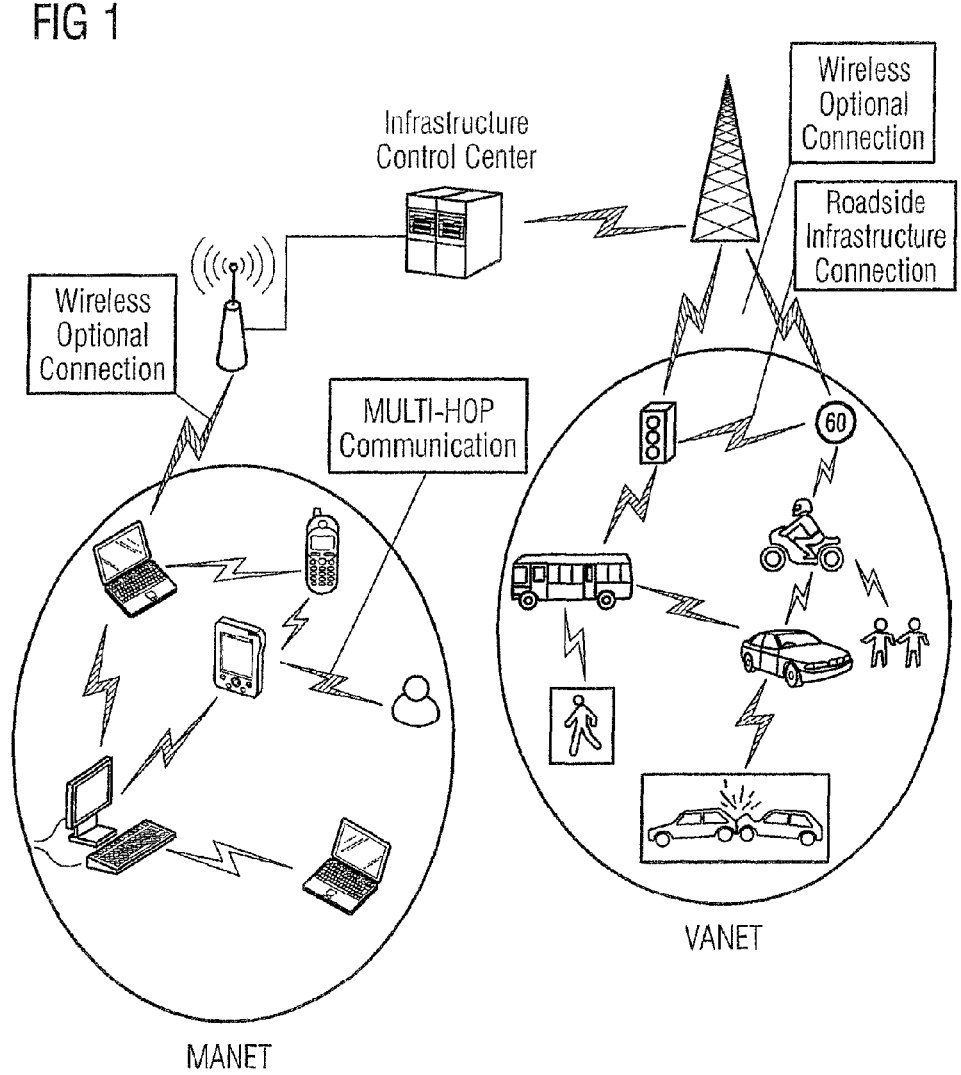
FIG. 1 illustrates the basic principle of MANETs and VANETs.

The present invention is especially advantageous if it is employed in a Mobile Ad-hoc Network (MANET) or a Vehicular Ad-hoc Network (VANET). A MANET is a network formed by nodes connected wirelessly by means of radio communication devices as shown on the left side of FIG. 1. These means include, but are not limited to WLAN, Bluetooth or infrared interfaces. Every node participating in a MANET can act as a client, server or a relay node for communications established among a set of nodes.

The MANET topology is arbitrary. Every node can move freely and unpredictably, even if eventually along predetermined paths. In general, MANET sizes are kept relatively small, but the number of their nodes can theoretically grow without limits.

MANETs can work independently of any infrastructure, even if some of the nodes can be connected to an infrastructure, thereby allowing the rest of the MANET to communicate with the infrastructure. The connection to the infrastructure may be wired or wireless.

The MANET nodes can be directly radio-connected to all the other nodes or can communicate with non in-range nodes by means of dedicated IP routing protocols, which allow for multi-hop communication. These routing protocols can be based on topology rules (proactive or reactive families like OLSR or AODV), or can relate to other criteria for determining the next hop to an IP destination, like the location of the nodes (geo-routing).

The families of used routing protocols are Unicast (one-to-one), Multicast (one-to-many), and Anycast (one-to-anyone); Broadcast (one-to-all) protocols are used for sending messages to every node of the MANET.

Each MANET node should be self-configuring in terms of which radio interface to use (if multiple interfaces are present), which medium access control (needed because the wireless medium is freely accessible by any node) and which routing protocol to run, but coherently with the other MANET nodes in order to be able to communicate with them.

When most of the MANET nodes are vehicles having proper wireless radio means installed on them (see the right side of FIG. 1), the network is called vehicular MANET or VANET. It is possible that some of the VANET nodes are in reality almost stationary, like cross-lights, roadside gateways, and VANET extensors or even pedestrians.

The main differences between MANETs and VANETs do not concern applications that can be run over them, but technical details at the lower OSI-layers. In particular, the high mobility of VANET nodes implies advanced access control, topology maintenance and routing procedures. Resources of vehicles or infrastructure devices are more important and allow for a better power and storage management. Positioning services like GPS or Galileo improve node tracking and services. The VANET node mobility is constrained on specific paths, which are in most cases digitally available.

VANETs are closely related with Intelligent Transportation Systems (ITS). Intelligent Transportation Systems can include solutions that use VANET concepts and technologies for improving road safety, in particular the so-called active safety which aims at applications like driver assistance/information or decentralized floating car data for better traffic flows. ITS can also deal with solutions for better comfort and/or entertainment for drivers and passengers like video chatting, internet connections or driving information.

In Intelligent Transportation Systems, it is often necessary to determine if a vehicle is moving in a predetermined direction. FIG. 2 shows one example how it can be determined if a moving entity is approaching a certain position. It is assumed that there are two objects A and B, wherein A may be a traffic sign and B may be a vehicle approaching the traffic sign A. The object B is moving towards the object A. B is supposed to know its own current physical geographical location (position) and the one of A as well.

As shown in FIG. 2, it seems simple for B to know that it is moving towards A or away from A. Seemingly, it suffices to compare its own last two distances from A, i.e. the distances $D_1(t_0)$ and $D_1(t_1)$, meaning the distance at time $t_0$ and the distance at time $t_1 > t_0$. If $D_1(t_1)$ is smaller than $D_1(t_0)$, B is moving towards A.

However, the comparison of these two distances is not enough for B to be able to know from which direction it is moving towards A. In the example given in FIG. 3, B moves towards A from two different directions. The condition $D_i(t_0) > D_i(t_1)$ is always satisfied with i=1, 2. Thus, considering only the distances of a moving object to another object at different instances of time is not enough to know if a moving object is moving towards the object from a specific direction.

FIG. 4 shows one embodiment of the present invention that is able to solve the above-mentioned problem. In this embodiment, a reference position R is given. The reference position R is chosen according to the specific direction (direction 1). Based on the distances between the positions of B at the different points in time to both, the position of A and the position of R, B is able to know if it is moving towards A from direction 1 or not. In more detail, B is considered to be moving towards A from direction 1 if, and only if, the two rules $D_1(t_0) > D_1(t_1)$ and $D_3(t_0) > D_3(t_1)$ are both satisfied.

FIG. 5 illustrates a scenario in which the invention may be used. It is assumed that a VANET is formed among vehicle communication equipment (onboard units) and roadside unit communication equipments. Vehicle-to-vehicle and vehicle-to-infrastructure communications are made possible. The vehicles and the roadside units may be equipped with a positioning system like GPS or Galileo. In the example, a speed limit traffic sign 501 is located along the road, as shown in FIG. 5. The traffic sign 501 is aware of its own physical location and the location of the roundabout 502 as well as the positions of reference points 510, 511, and 512. In FIG. 5, vehicles driving towards the traffic sign or the roundabout may come from four directions: direction 1, direction 2, direction 3, or direction 4. The traffic sign broadcasts the speed limit information that concerns only vehicles coming from direction 1 (like for example vehicle 520) and is broadcasting the roundabout presence, which is concerning only vehicles from direction 1, direction 2, and direction 4. Vehicles traveling in direction 3 may turn right and travel in the opposite direction of direction 1. Furthermore, the traffic sign 501 broadcasts the positions of the reference points 510, 511, and 512. Based on the reference point 510 the vehicle 520 can determine that it is traveling in direction 1 and that, therefore, the speed limit is relevant for it. The reference point 511 allows to determine that a vehicle is traveling in direction 2 and the reference point 512 allows to determine that a vehicle is traveling in direction 4.

According to one exemplary aspect of the invention, it is an object that only those drivers are informed of the speed limit information and the information about the roundabout for which this information is relevant based on their traveling direction. Therefore, it is necessary to determine if a moving entity is moving in a predetermined direction.

According to one aspect of the invention, a sender (for example the traffic sign 501) sends packets that may contain for example the information shown in FIG. 6. The example of the data packet structure as shown in FIG. 6 comprises a column 601 in which the point of interest position is given (for example the position of the traffic sign 501), a column 602 in which the reference position is given (for example the position of the reference point 510), and a column 603 for related information, like e.g. the corresponding speed limit.

Figure 7:
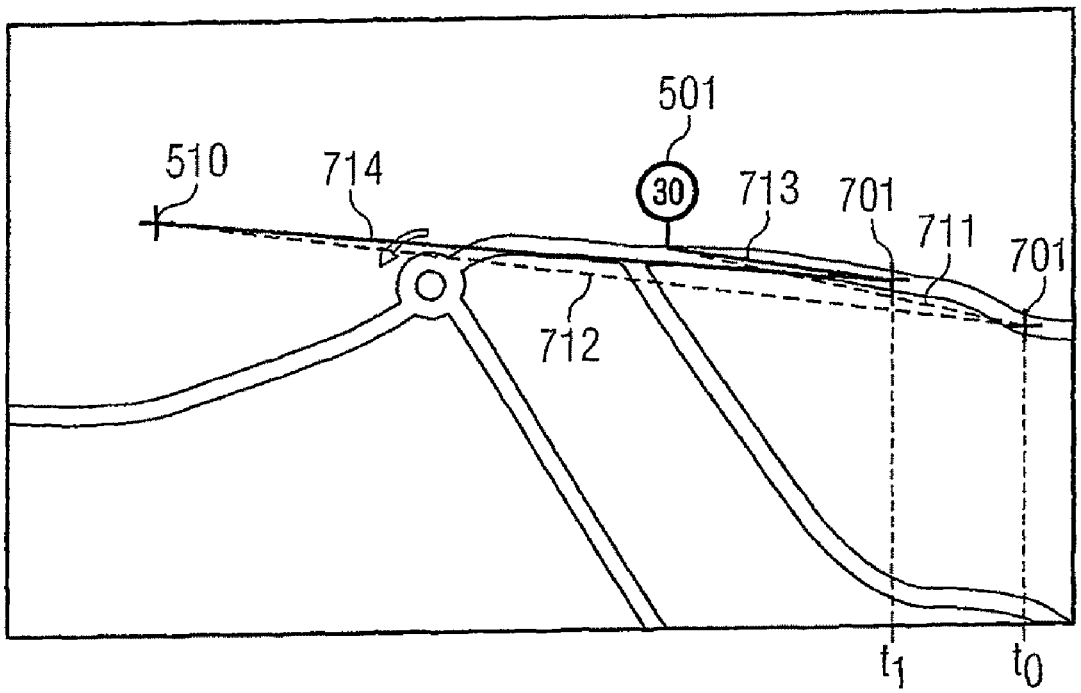
FIG. 7 illustrates a first embodiment of the present invention.

In the embodiment shown in FIG. 7, the vehicle 701 approaching the traffic sign 501 receives the data packet and calculates two distances at a first point in time $t_0$. At $t_0$, the vehicle 701 calculates a first distance 711 between its own position and the traffic sign 501 and a second distance 712 between its own position and the reference point 510. At a second point in time $t_1$, the vehicle 701 calculates two distances again. It calculates a third distance 713 between its own position and the position of the traffic sign 501, as well as a fourth distance 714 between its own position and the position of the reference point 510. If the distance 711 is larger than the distance 713, and if the distance 712 is larger than the distance 714, the vehicle 701 is driving towards the traffic sign 501, which means that the vehicle is concerned by the speed limit indicated by the traffic sign 501. Therefore, the driver of vehicle 701 should be informed accordingly.

Figure 8:
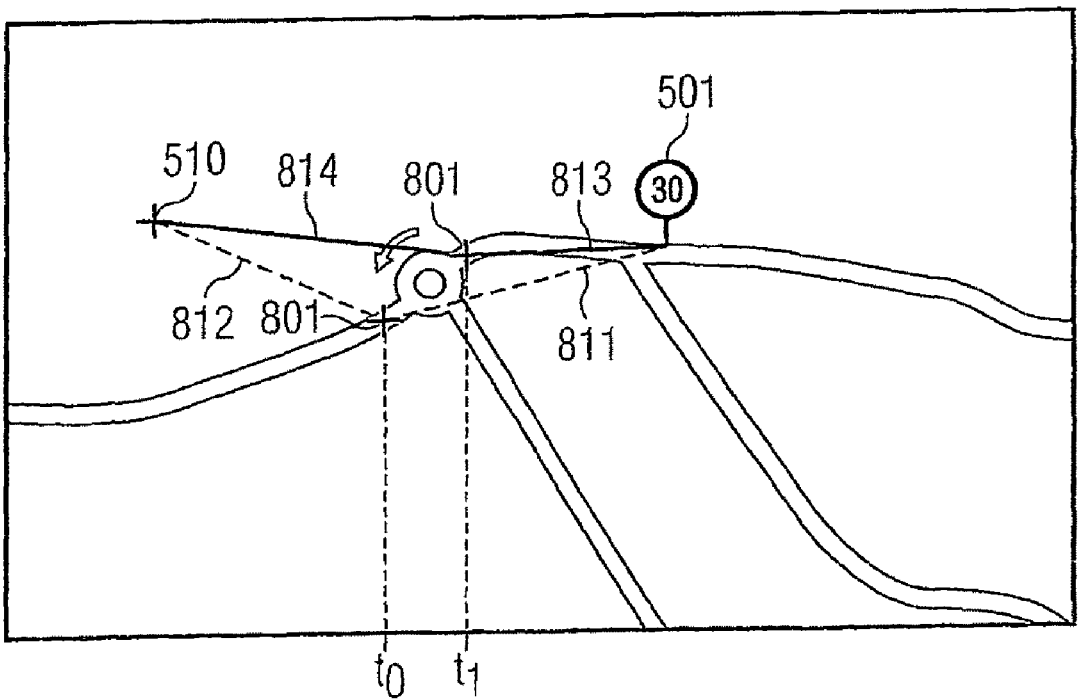
FIG. 8 illustrates the first embodiment of the present invention when the vehicle comes from the opposite direction.

FIG. 8 shows another scenario in which the vehicle 801 approaches the traffic sign 501 from the opposite direction. The condition that the distance 811 is larger than the distance 813 and the distance 812 is larger than the distance 814 is not satisfied. Thus, based on the discussed embodiment of the invention, the vehicle is able to know that it is not concerned by the speed limit which is sent by the traffic sign 501.

Figure 9:
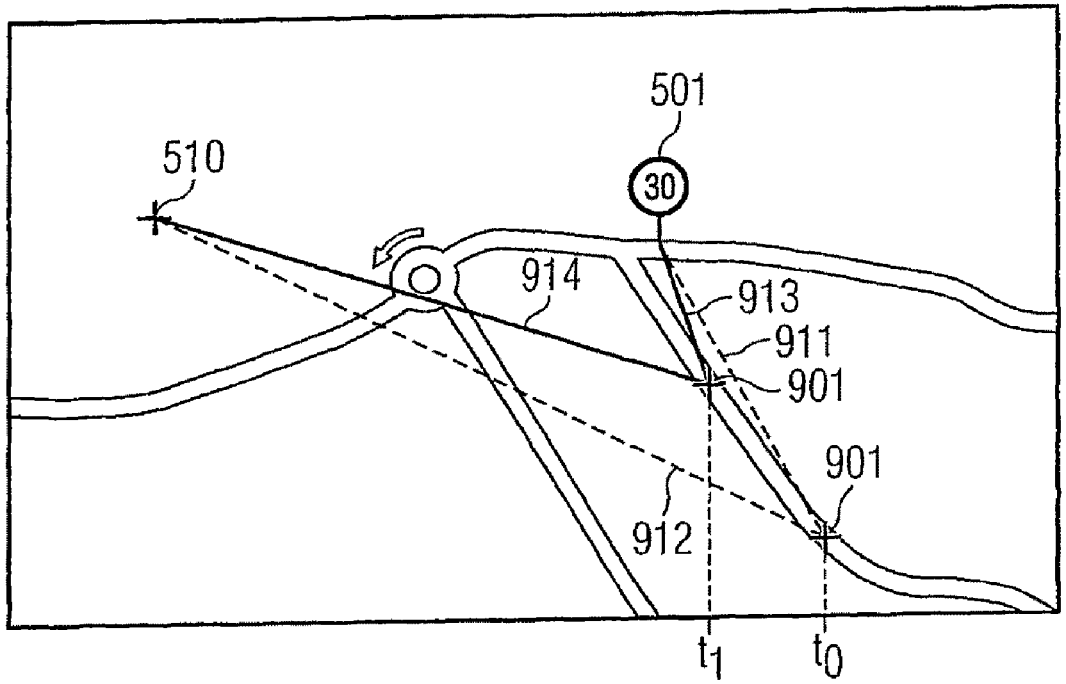
FIG. 9 illustrates one drawback of the first embodiment of the present invention.

In many scenarios, it is sufficient to compare the four distances as discussed to determine from which side a vehicle is approaching a traffic sign. Nevertheless, in some scenarios, problems may occur as illustrated by FIG. 9. In FIG. 9, the vehicle 901 is not driving on the road for which the traffic sign 501 is valid. Nevertheless, the distance 911 is larger than the distance 913, and the distance 912 is larger than the distance 914. This means that if only four distances were compared, the driver of the vehicle 901 would be informed of the speed limit that is currently not valid for him.

Figure 10:
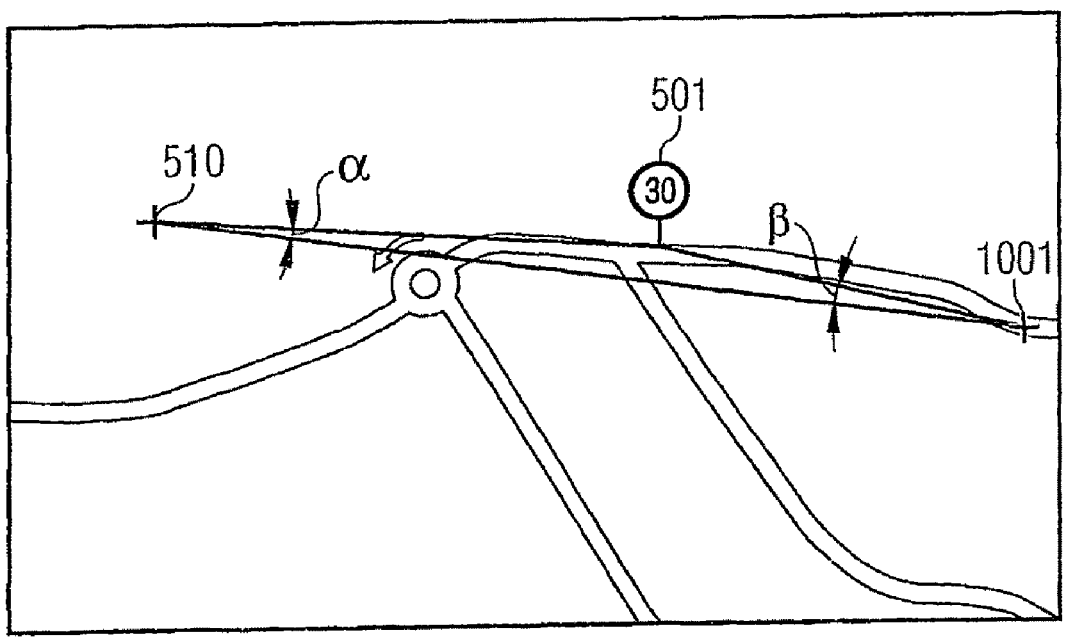
FIG. 10 illustrates a basic principle of a second embodiment of the present invention.

Therefore, according to another aspect of the invention, an angle α between a reference distance between the traffic sign 501 and the reference point 510 and a distance between the vehicle 1001 and the reference point 510 is considered as shown in FIG. 10. Alternatively, the angle β between a distance between the vehicle 1001 and the traffic sign 501 and the distance between the vehicle 1001 and the reference point 510 may be used. The angle α or β must be lower than a certain maximum angle $α_{max}$ or $β_{max}$. If this condition is met, the likelihood is significantly increased that the vehicle 1001 is really traveling in the determined direction.

Thus, according to a preferred embodiment, it is determined that a vehicle is traveling in a predetermined direction if the following three conditions are satisfied:

1. A distance ($D_{V2S}(t_0)$) between the vehicle and the point of interest at a first point in time is larger than a distance ($D_{V2S}(t_1)$) between the vehicle and the point of interest at a second point in time, wherein $t_1 > t_0$.

2. A distance ($D_{V2R}(t_0)$) between the vehicle and the reference point at a first point in time is larger than a distance ($D_{V2R}(t_1)$) between the vehicle and the reference point at a second point in time, wherein $t_1 > t_0$.

$$\frac{D_{R2S}^2 - D_{V2S}^2(t_1) + D_{V2R}^2(t_1)}{2 * D_{R2S} + D_{V2R}(t_1)} > \cos(\alpha_{max}), \quad 3.$$

wherein $D_{R2S}$ is a reference distance between the traffic sign 501 and the reference point 510.

Figures 11, 12:
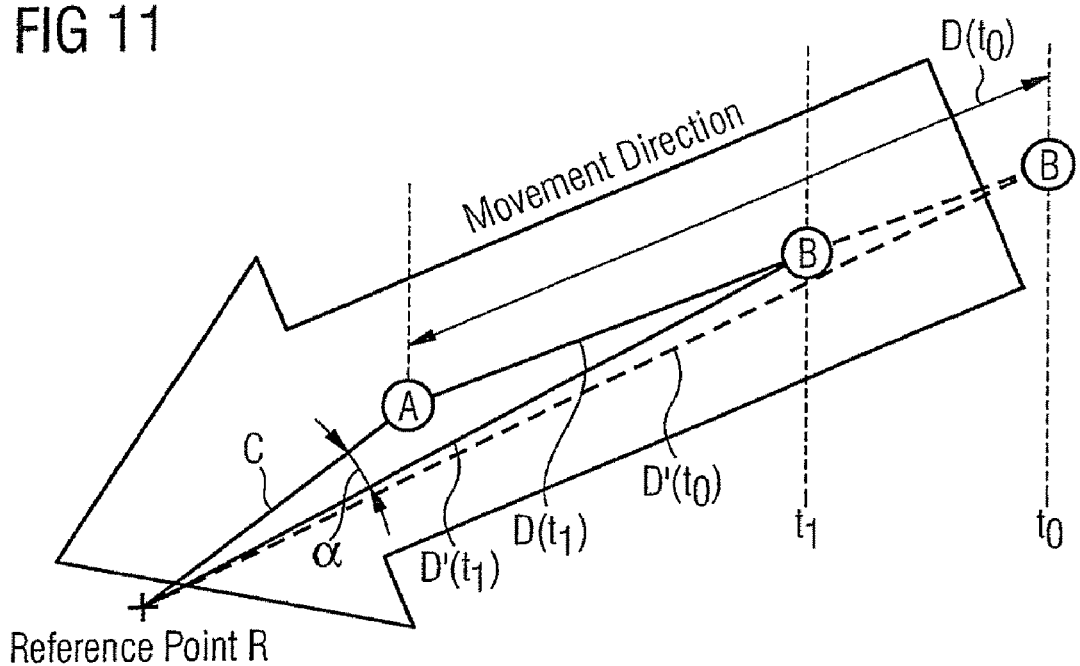
FIG. 11 illustrates the distances used by the second embodiment of the present invention.
FIG. 12 illustrates a further embodiment of a data set that may be used according to the invention.

FIG. 11 shows a generalization of the concept according to one embodiment of the invention. A node B is moving towards the point of interest A. The node B has different positions at $t_0$ and $t_1$. The distance between the node B and the point of interest A at $t_0$ is labeled $D(t_0)$. The distance between the node B and the reference point R at $t_0$ is labeled $D'(t_0)$. At $t_1$, the distance between the node B and the point of interest A is labeled $D(t_1)$, whereas the distance between the node B and the reference point R is labeled $D'(t_1)$. A reference distance between the reference point and the point of interest A is labeled C. The angle between the distance C and the distance $D'(t_1)$ is labeled α. The node B is moving towards the point of interest A if:

$$D(t_0) > D(t_1), \qquad\qquad 1.$$

$$D'(t_0) > D'(t_1), \text{ and} \qquad\qquad 2.$$

$$\frac{C^2 - D^2(t_1) + D'^2(t_1)}{2*C*D'(t_1)} > \cos(\alpha_{max}). \qquad\qquad 3.$$

The sender may send information relating to a plurality of points of interest and a plurality of predetermined directions. For example in the scenario shown in FIG. 5, a table shown in FIG. 12 may have multiple entries. For example to determine that a vehicle is moving in direction 4 towards the roundabout 502, a different reference point is needed then to determine that a vehicle is traveling in the direction 2 towards the roundabout 502. Therefore, the data that is sent by the sender may comprise multiple points of interest and multiple reference positions.

As shown in FIG. 12, a suitable data structure may be to have a column 1201 for the point of interest positions, a column 1202 for the reference positions, a column 1203 for the maximum angles, and a column 1204 for related information. This table can be saved locally on the sender or somewhere else, e.g. on a server connected to the sender. The table can be dynamic or static, depending on the use case. If the table is static, it would be better to store the table on the sender, so that there is no need for any external connection. If the table is dynamic, the intelligence for changing the table can be located on the sender itself (for example a rain sensor on a road side unit would decrease the speed limit automatically if it rains) or at a remote location (e.g. on a server or a management center). The same information can have different directions of interest. Therefore, the same information can have several entries in the same information table with different reference points (for example in FIG. 5, the roundabout 502 is concerning three driving directions, direction 1, direction 2, and direction 4).

Figure 13:
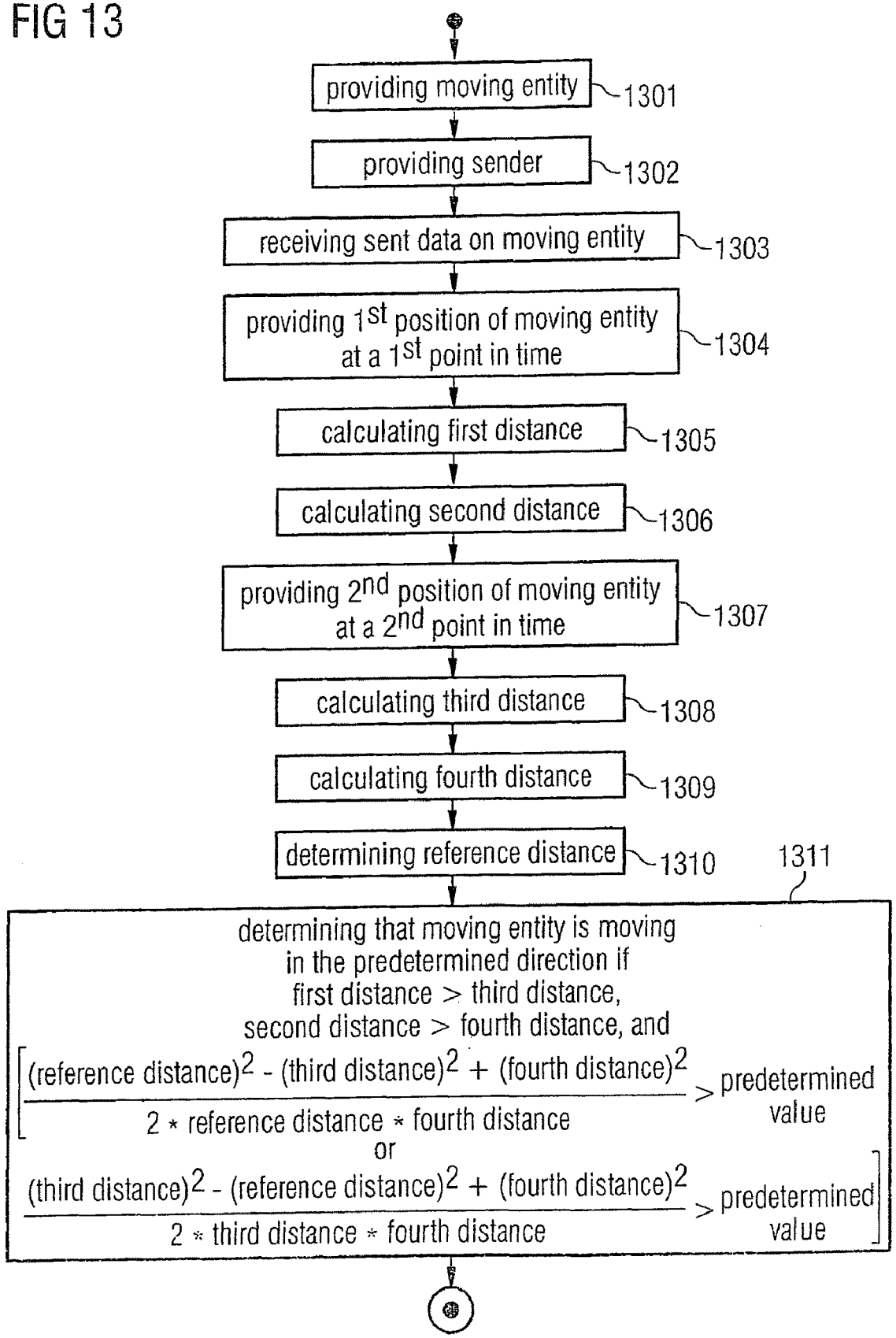
FIG. 13 shows one embodiment of the method according to the present invention.

FIG. 13 shows a preferred embodiment of a method according to the present invention. In step 1301, a moving entity having positioning means and receiving means is provided. In step 1302, a sender sending data dependent on a position of a point of interest, a position of a reference point, and a predetermined value is provided. The data sent by the sender is received on the moving entity in step 1303.

In step 1304, a first position of the moving entity at a first point in time is provided. A first distance between the moving entity and the point of interest is calculated in step 1305, based on the received data and the first position. A second distance between the moving entity and the reference point is calculated in step 1306, based on the received data and the first position.

In step 1307, a second position of the moving entity at a second point in time is provided. Based on the received data and the second position, a third distance between the moving entity and the point of interest is calculated in step 1308. A fourth distance is calculated in step 1309 between the moving entity and the reference point, based on the received data and the second position.

In step 1310, a reference distance between the position of the point of interest and the position of the reference point is determined. In step 1311, it is determined that the moving entity is moving in the predetermined direction if the first distance is larger than the third distance, the second distance is larger than the fourth distance, and $$\left[\frac{(\text{reference distance})^2 - (\text{third distance})^2 + (\text{fourth distance})^2}{2*\text{reference distance}*\text{fourth distance}}\right]$$

is larger than the predetermined value (dependent on the angle between the reference distance and the fourth distance) or $$\frac{(\text{third distance})^2 - (\text{reference distance})^2 + (\text{fourth distance})^2}{2*\text{third distance}*\text{fourth distance}}$$

is larger than the predetermined value (dependent on the angle between the third distance and the fourth distance).

Figure 14:
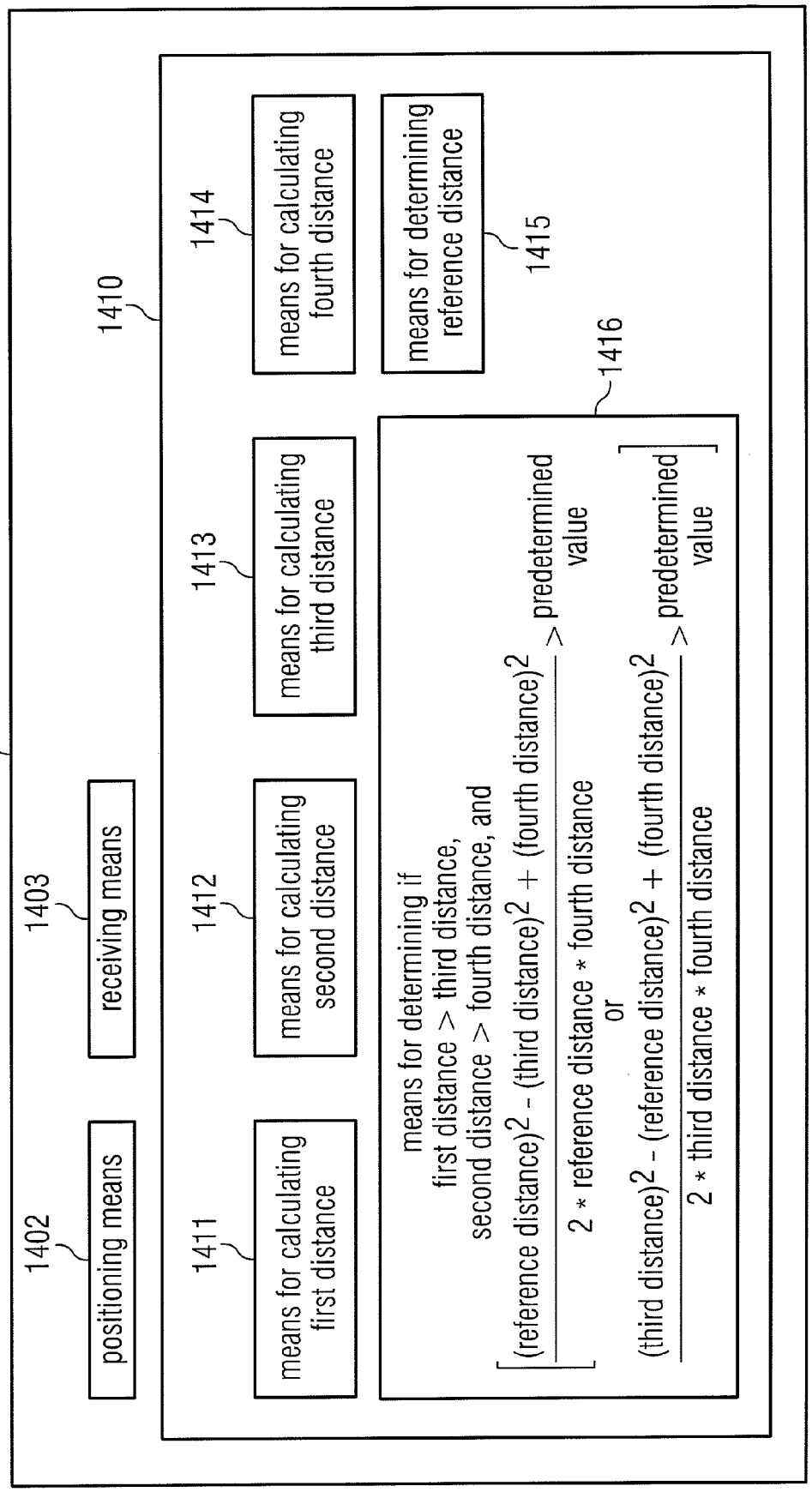
FIG. 14 shows one embodiment of an apparatus for determining whether or not a moving entity is moving in a predetermined direction according to the present invention.

FIG. 14 shows one embodiment of an apparatus according to the present invention. The apparatus 1401 comprises positioning means 1402 for positioning the moving entity. The positioning means 1402 is able to provide a first position of the moving entity at a first point in time and a second position of the moving entity at a second point in time. Furthermore, the apparatus 1401 comprises receiving means 1403 for receiving data sent by a sender sending data dependent on a position of a point of interest, a position of a reference point, and a predetermined value.

The apparatus 1401 further comprises determination means 1410 for determining if the moving entity is moving in the predetermined direction, based on the data received by the receiving means 1403, a first position of the moving entity and a second position of the moving entity provided by the positioning means 1402 at a first and second point in time. The determination means 1410 comprises means for calculating a first distance 1411 between the moving entity and the point of interest, based on the data received by the receiving means and the first position. Additionally, it comprises means for calculating a second distance 1412 between the moving entity and the reference point, based on the data received by the receiving means and the first position. In the same way, it comprises means for calculating a third distance 1413 between the moving entity and the point of interest, based on the data received by the receiving means and the second position, as well as means for calculating a fourth distance 1414 between the moving entity and the reference point, based on the data received by the receiving means and the second position.

Moreover, the determination means 1410 comprises means for determining a reference distance 1415 between the position of the point of interest and the position of the reference point. In addition, the determination means 1410 comprises means for determining that the moving entity is moving in the predetermined direction if the first distance is larger than the third distance, the second distance is larger than the fourth distance, and $$\left[\frac{(\text{reference distance})^2 - (\text{third distance})^2 + (\text{fourth distance})^2}{2*\text{reference distance}*\text{fourth distance}}\right]$$

is larger than the predetermined value (dependent on the angle between the reference distance and the fourth distance) or $$\frac{(\text{third distance})^2 - (\text{reference distance})^2 + (\text{fourth distance})^2}{2 * \text{third distance} * \text{fourth distance}}$$

is larger than the predetermined value (dependent on the angle between the third distance and the fourth distance).

The invention may have the advantages that a moving entity is enabled to determine if it is moving towards another object or towards a particular location from a specific direction, possibly related to an application. The sender may be enabled to indicate one or more specific directions of interest to other objects only by providing the positions of points of interest and one or more reference positions, possibly without the need for a geographic map. The invention may provide a suitable packet format for the communication between objects having the need to determine if they are moving in a predetermined direction. Furthermore, the invention may allow to update the information that is sent by the sender.

The specifications and drawings are to be regarded in an illustrative rather than a restrictive sense. It is evident that various modifications and changes may be made thereto without departing from the scope of the invention as set forth in the claims. It is possible to combine the features described in the embodiments in a modified way for providing additional embodiments that are optimized for a certain usage scenario. As far as such modifications are readily apparent for a person skilled in the art, these modifications shall be regarded as implicitly disclosed by the above described embodiments.

The invention claimed is:

1. Method for determining whether a moving entity is moving in a predetermined direction, comprising the steps of:
   providing a moving entity having positioning unit and receiving unit,
   providing a sender sending data dependent on a position of a point of interest and a position of a reference point,
   receiving said data sent by said sender on the moving entity,
   providing a first position of the moving entity at a first point in time by the positioning unit,
   calculating a first distance between the moving entity and the point of interest based on the received data and the first position,
   calculating a second distance between the moving entity and the reference point based on the received data and the first position,
   providing a second position of the moving entity at a second point in time by the positioning unit,
   calculating a third distance between the moving entity and the point of interest based on the received data and the second position,
   calculating a fourth distance between the moving entity and the reference point based on the received data and the second position, and
   determining on the moving entity whether the moving entity is moving in the predetermined direction based on the received data, the first position of the moving entity, the second position of the moving entity, the first distance, the second distance, the third distance, and the fourth distance.

2. Method according to claim 1, further comprising a step of determining that the moving entity is moving in the predetermined direction if first distance>third distance and second distance>fourth distance.

3. Method according to claim 1, further comprising the steps of:
   calculating verification data, and
   verifying whether the moving entity is moving in the predetermined direction based on the verification data.

4. Method according to claim 3, further comprising the steps of:
   determining a reference distance between the position of the point of interest and the position of the reference point, and
   calculating verification data depending on an angle between the reference distance and a distance between the moving entity and the reference point.

5. Method according to claim 4, further comprising a step of calculating verification data based on a comparison of $(((\text{reference distance})^2-(\text{third distance})^2+(\text{fourth distance})^2)/(2*\text{reference distance}*\text{fourth distance}))$ with a predetermined value or a comparison of $(((\text{third distance})^2-(\text{reference distance})^2+(\text{fourth distance})^2)/(2*\text{third distance}*\text{fourth distance}))$ with a predetermined value.

6. Method according to claim 3, further comprising a step of calculating verification data depending on an angle between the first distance and the second distance or calculating verification data depending on an angle between the third distance and the fourth distance.

7. Method according to claim 1, further comprising a step of determining that the moving entity is moving in the predetermined direction if first distance>third distance, second distance>fourth distance, and $[(((\text{reference distance})^2-(\text{third distance})^2+(\text{fourth distance})^2)/(2*\text{reference distance}*\text{fourth distance}))>$ a predetermined value or $(((\text{third distance})^2-(\text{reference distance})^2+(\text{fourth distance})^2)/(2*\text{third distance}*\text{fourth distance}))>$ a predetermined value].

8. Method according to claim 1, further comprising a step of updating the data that is sent by the sender.

9. Method according to claim 1, wherein the data comprises a predetermined value.

10. Method according to claim 1, wherein the data comprises a plurality of positions relating to a plurality of points of interest and a plurality of positions of reference points each relating to at least one point of interest.

11. Method according to claim 1, wherein the data comprises a plurality of predetermined values, each relating to a predetermined direction.

12. Method for determining whether a moving entity is moving in a predetermined direction, comprising the steps of:
   providing a moving entity having positioning unit and receiving unit,
   providing a sender sending data dependent on a position of a point of interest, a position of a reference point, and a predetermined value,
   receiving said data sent by said sender on the moving entity,
   providing a first position of the moving entity at a first point in time by the positioning unit,
   calculating a first distance between the moving entity and the point of interest based on the received data and the first position,
   calculating a second distance between the moving entity and the reference point based on the received data and the first position,
   providing a second position of the moving entity at a second point in time by the positioning unit,
   calculating a third distance between the moving entity and the point of interest based on the received data and the second position, calculating a fourth distance between the moving entity and the reference point based on the received data and the second position, determining a reference distance between the position of the point of interest and the position of the reference point, and determining that the moving entity is moving in the predetermined direction if first distance>third distance, second distance>fourth distance, and [(((reference distance)$^2$−(third distance)$^2$+(fourth distance)$^2$)/(2*reference distance*fourth distance))>the predetermined value or (((third distance)$^2$−(reference distance)$^2$+(fourth distance)$^2$)/(2*third distance*fourth distance))>a predetermined value].

13. Apparatus for determining whether a moving entity is moving in a predetermined direction, comprising:

positioning unit for positioning the moving entity, receiving unit for receiving data dependent on a position of a point of interest and a position of a reference point, and a data processing unit configured to:

provide a first position of the moving entity at a first point in time, calculate a first distance between the moving entity and the point of interest based on the data received by the receiving unit and the first position, calculate a second distance between the moving entity and the reference point based on the data received by the receiving unit and the first position, provide a second position of the moving entity at a second point in time, calculate a third distance between the moving entity and the point of interest based on the data received by the receiving unit and the second position, calculate a fourth distance between the moving entity and the reference point based on the data received by the receiving unit and the second position, and determine whether the moving entity is moving in the predetermined direction based on the data received by the receiving unit, the first position of the moving entity, the second position of the moving entity, the first distance, the second distance, the third distance, and the fourth distance.

14. Apparatus according to claim 13, wherein the data processing unit is further configured to determine that the moving entity is moving in the predetermined direction if first distance>third distance and second distance>fourth distance.

15. Apparatus according to claim 13, wherein the data processing unit is further configured to:

calculate verification data, and verify whether the moving entity is moving in the predetermined direction based on the verification data.

16. Apparatus according to claim 15, wherein the data processing unit is further configured to:

determine a reference distance between the position of the point of interest and the position of the reference point, and calculate verification data depending on an angle between the reference distance and a distance between the moving entity and the reference point.

17. Apparatus according to claim 16, wherein the data processing unit is further configured to calculate verification data based on a comparison of (((reference distance)$^2$−(third distance)$^2$+(fourth distance)$^2$)/(2*reference distance*fourth distance)) with a predetermined value or a comparison of (((third distance)$^2$−(reference distance)$^2$+(fourth distance)$^2$)/(2*third distance*fourth distance)) with a predetermined value.

18. Apparatus according to claim 15, wherein the data processing unit is further configured to calculate verification data depending on an angle between the first distance and the second distance or calculate verification data depending on an angle between the third distance and the fourth distance.

19. Apparatus according to claim 13, wherein the data processing unit is further configured to determine that the moving entity is moving in the predetermined direction if first distance>third distance, second distance>fourth distance, and [(((reference distance)$^2$−(third distance)$^2$+(fourth distance)$^2$)/(2*reference distance*fourth distance))>a predetermined value or (((third distance)$^2$−(reference distance)$^2$+(fourth distance)$^2$)/(2*third distance*fourth distance))>a predetermined value].

20. Apparatus for determining whether a moving entity is moving in a predetermined direction, comprising:

positioning unit for positioning the moving entity, receiving unit for receiving data sent by a sender sending data dependent on a position of a point of interest, a position of a reference point, and a predetermined value, a positioning unit for providing a first position of the moving entity at a first point in time, and a data processing unit configured to:

calculate a first distance between the moving entity and the point of interest based on the data received by the receiving unit and the first position, calculate a second distance between the moving entity and the reference point based on the data received by the receiving unit and the first position, provide a second position of the moving entity at a second point in time, calculate a third distance between the moving entity and the point of interest based on the data received by the receiving unit and the second position, calculate a fourth distance between the moving entity and the reference point based on the data received by the receiving unit and the second position, and determine a reference distance between the position of the point of interest and the position of the reference point, and determine that the moving entity is moving in the predetermined direction if first distance>third distance, second distance>fourth distance, and [(((reference distance)$^2$−(third distance)$^2$+(fourth distance)$^2$)/(2*reference distance*fourth distance))>the predetermined value or (((third distance)$^2$−(reference distance)$^2$+(fourth distance)$^2$)/(2*third distance*fourth distance))>a predetermined value].

21. A non-transitory computer readable medium storing at least one sequence of instructions executable by one or more processors of a data processing unit of a data processing apparatus being connectable to a positioning unit for positioning a moving entity and a receiving unit for receiving data dependent on positions of points of interest and positions of reference points, wherein execution of the at least one sequence of instructions by the one or more processors causes the data processing unit to perform the steps of:

providing a first position of the moving entity at a first point in time, calculating a first distance between the moving entity and the point of interest based on the data received by the receiving unit and the first position, calculating a second distance between the moving entity and the reference point based on the data received by the receiving unit and the first position, providing a second position of the moving entity at a second point in time, calculating a third distance between the moving entity and the point of interest based on the data received by the receiving unit and the second position, calculating a fourth distance between the moving entity and the reference point based on the data received by the receiving unit and the second position, and determining whether the moving entity is moving in the predetermined direction based on the data received by the receiving unit, the first position of the moving entity, the second position of the moving entity, the first distance, the second distance, the third distance, and the fourth distance.

* * * * *